United States Patent
Lindheimer et al.

(10) Patent No.: US 8,154,982 B2
(45) Date of Patent: Apr. 10, 2012

(54) APPARATUS AND METHOD FOR DYNAMICALLY ASSIGNING ORTHOGONAL CODES IN A RADIO COMMUNICATION SYSTEM

(75) Inventors: Christofer Lindheimer, Kista (SE); Niclas Wiberg, Linköping (SE); Per Magnus Lundevall, Sollentuna (SE); Lars O Mårtensson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1241 days.

(21) Appl. No.: 11/815,788

(22) PCT Filed: Feb. 11, 2005

(86) PCT No.: PCT/SE2005/000181
§ 371 (c)(1),
(2), (4) Date: Aug. 29, 2007

(87) PCT Pub. No.: WO2006/085800
PCT Pub. Date: Aug. 17, 2006

(65) Prior Publication Data
US 2008/0153505 A1    Jun. 26, 2008

(51) Int. Cl.
*H04J 11/00* (2006.01)

(52) U.S. Cl. .................................... 370/208; 370/329

(58) Field of Classification Search ............... 370/208, 370/329, 464, 465; 708/100
See application file for complete search history.

(56) References Cited

U.S. PATENT DOCUMENTS

| 2003/0210660 A1* | 11/2003 | Wiberg et al. | 370/320 |
| 2005/0036461 A1* | 2/2005 | Keil et al. | 370/329 |
| 2005/0171984 A1* | 8/2005 | Wang et al. | 708/100 |
| 2005/0226267 A1* | 10/2005 | Pedersen et al. | 370/465 |
| 2005/0265381 A1* | 12/2005 | Kim et al. | 370/464 |

FOREIGN PATENT DOCUMENTS
WO    WO 03107707 A1    12/2003
* cited by examiner

*Primary Examiner* — Ricky Ngo
*Assistant Examiner* — Phuongchau B Nguyen

(57) ABSTRACT

An apparatus. method, and system for dynamically assigning orthogonal codes to different information signals communicated between a Node B and user equipment in a cellular radio communication system in which a fixed number of codes are allocated between dedicated transport channels (DCHs) and high speed downlink shared channels (HS-DSCHs). A radio controller (RNC) allocates a minimum number of codes for HS-DSCH physical channels (HS-PDSCH codes) to the Node B. The Node B determines HS-PDSCH codes that are not currently being utilized and allocates HS-PDSCH codes from the unused codes without having to communicate with the RNC. When the additional HS-PDSCH codes are needed for DCH codes, the Node B reallocates the codes for DCH purposes without reducing the number of HS-PDSCH codes below the allocated minimum.

19 Claims, 5 Drawing Sheets

APPARATUS AND METHOD FOR DYNAMICALLY ASSIGNING ORTHOGONAL CODES IN A RADIO COMMUNICATION SYSTEM

TECHNICAL FIELD OF THE INVENTION

The present invention relates generally to communication networks. More particularly, and not by way of limitation, the present invention is directed to an apparatus and method for dynamically assigning orthogonal codes to different information signals in a cellular radio communication system that utilizes spread spectrum modulation and code division multiple access (CDMA) techniques.

DESCRIPTION OF RELATED ART

In a typical CDMA cellular radio communication system, an information data stream to be transmitted is superimposed on a much higher bit rate data stream sometimes known as a spreading code. Each symbol of the spreading code is commonly referred to as a chip. The information signal and the spreading code signal are typically combined by multiplication in a process sometimes called coding or spreading the information signal. Each information signal is allocated a unique spreading code. Different information signals within the same spreading code may be separated into different codes that are orthogonal, or different information signals may be separated simply by using different spreading codes.

In the 3rd Generation Partnership Project, Technical Specification Group Radio Access Network, RRC Protocol Specification (3GPP TS 25.308, UTRA High Speed Downlink Packet Access (HSDPA); Overall description; Stage 2), a new downlink transport channel, the High Speed Downlink Shared Channel (HS-DSCH), is introduced. Compared to the DCH channels, HS-DSCH enables more efficient transmission having higher capacity, higher bit rates, and reduced delays. The common name for this concept is High-Speed Downlink Packet Access (HSDPA).

HSDPA is based on five main technologies:
1. shared-channel transmission;
2. higher-order modulation;
3. link adaptation;
4. radio-channel-dependent scheduling; and
5. hybrid ARQ with soft combining.

The objective of HSDPA is to provide a common robust channel with means to explore channel quality variations for different users at different times and optimize transmission in each given instant, in terms of coding, modulation, and selected receiving user conditions. Shared channel transmission is beneficial, especially for non-continuous services, and enables efficient usage of resources. Higher order modulation allows for a higher peak data rate and higher system capacity. Link adaptation enables instantaneous channel conditions to be taken into account when transmitting data. Similarly, radio-dependent scheduling enables the radio communication system to favor users in good radio conditions for transmission resource usage over users in poor radio conditions. Finally, hybrid-Automatic Repeat Request protocols with soft combining reduces the number of retransmissions required and also provides a higher capacity and more robust link adaptation functionality.

FIG. 1 is a simplified block diagram illustrating protocol stacks and interfaces utilized between a User Equipment (UE) 11, a Node B (i.e., radio base station) 12, a Controlling Radio Network Controller (CRNC) 13, and a Serving Radio Network Controller (SRNC). With HSDPA, the physical layer becomes more complex as an additional MAC protocol, MAC-hs 15, is introduced. On the network side, the MAC-hs protocol is implemented in the Node B. The MAC-hs protocol includes the retransmission protocol, link adaptation, and channel dependent scheduling. The increase in complexity with HSDPA is thus mainly related to the introduction of this intelligent Layer 2 protocol in the Node B.

FIG. 2 is an illustrative drawing of a typical Orthogonal Variable Spreading Factor (OVSF) code allocation tree 21 and possible allocations for High Speed Physical Downlink Shared Channel (HS-PDSCH) codes. The OVSF code tree illustrates a way to separate different transmission signals for a certain spreading code. HS-DSCH can make use of the same orthogonal code tree and the same spreading code as is used for dedicated channels, control channels, and pilot channels. 3GPP specifies that an HS-DSCH allocation can have a maximum of fifteen (HS-PDSCH) codes 22, each of them with Spreading Factor (SF)-16. The transport channel HS-DSCH is mapped onto one or several physical channels (HS-PDSCHs) each using one SF-16 code. Similarly, a dedicated transport channel (DCH) is mapped onto a dedicated physical channel (DPCH) that uses a certain SF in the range of SF256 to SF4. The code tree contains sixteen (16) SF-16 codes and thus, when the maximum of fifteen HS-PDSCH channels are allocated, only one SF-16 code 23 remains for other channels. The SF-16 code 23 allocated to the other channels may be further spread for individual channels, and FIG. 2 illustrates this spreading to SF-256.

FIG. 2 illustrates a number of exemplary transport channels mapped to different positions in the code tree: Primary Common Pilot Channel (P-CPICH), Broadcast Control Channel (BCH), Paging Channel (PCH), Page Indication Channel (PICH), Acquisition Indicator Channel (AICH), High Speech Shared Control Channel (HS-SCCH), and a number of low spreading factor dedicated channels referred to as associated dedicated channels (A-DCH). These A-DCH's can be used together with HS-DSCH for dedicated signaling.

There is of course a trade-off in the number of spreading codes that are made available for HS-DSCH channels. Allocating a high number of codes for HS-DSCH channels results in fewer channels being available for allocations for dedicated transport channels (DCH) such as speech connections or video connections. Thus, if there is a high DCH demand, allocating fewer codes for HS-DSCH channels is beneficial from a service availability point of view, whereas if there are a high number of users allocated to HSDPA transmissions, it is preferable to allocate a high number of HS-PDSCH codes, as this will provide high bit-rate connections and increased end-user experience.

The CRNC has control over the complete code tree situation. Therefore, the CRNC provides the configuration of the HS-DSCH, that is, how many (SF-16) codes should be used. The CRNC controls this through the 3GPP-specified NBAP-protocol over the $I_{ub}$ interface 16, and the HS-DSCH is set up according to a configuration message sent to the Node B 12. The algorithm for making the allocations, however, is not standardized and different approaches may be utilized. For example, the allocations may be made in a static manner in which a fixed number of codes are allocated for HSDPA transmissions, and any change to the allocation requires a reconfiguration by the system operator. The spreading code allocations may also be made dynamically by the CRNC based, for example, on measurements in the Node B and the RNC.

Both of the existing approaches to spreading code allocation have disadvantages. With a fixed configuration of HS- PDSCH codes, a trade-off is necessary. The allocation of HS-PDSCH codes must be large enough to handle arriving HS-DSCH traffic. On the other hand, the allocation must be small enough to prevent high DCH blocking. In a fluctuating traffic environment, therefore, a dynamic approach is needed.

With a dynamic allocation of codes, the RNC would optimally need information from the Node B regarding Node B capabilities and utilization of HS-PDSCH codes. Further, a dynamic allocation algorithm in the RNC must consider a number of criteria from the RNC such as the rate of DCH code blocking, and also a number of criteria from the Node B such as power availability. Further, if the algorithm changes the allocation of the number of HS-PDSCH codes too frequently (for example, triggered on single events), the allocation and de-allocation may become too "bursty", with excess signaling over the $I_{ub}$ interface. However, if the allocation rate is too slow, the process experiences more of the problems associated with the fixed approach. Therefore, the algorithm must also attempt to find an optimum allocation rate. Thus, the problem quickly becomes very complex.

Accordingly, there is a need for an apparatus and method to efficiently optimize the allocation of spreading codes between DCH channels and HS-PDSCH codes. The present invention provides such an apparatus and method.

SUMMARY OF THE INVENTION

In one aspect, the present invention is directed to an apparatus for dynamically assigning orthogonal codes to different information signals communicated between a Node B (i.e., radio base station) and a user terminal in a cellular radio communication system in which a number of codes are allocated between dedicated transport channels (DCHs) and a high speed downlink shared channel (HS-DSCH), and a radio network controller allocates codes for HS-DSCH to the radio base station. The apparatus is characterized by discretionary code allocation means within the radio base station that allocates and de-allocates additional codes for HS-DSCH in addition to the number of codes given from the radio network controller. The discretionary code allocation means treats the HS-PDSCH codes allocated by the radio network controller as a minimum number of HS-PDSCH codes allocated to the radio base station, and allocates and reallocates unused codes without communicating with the radio network controller.

In another aspect of the present invention, the allocations of codes for HS-DSCH (HS-PDSCH codes) and the codes used for other transport channels are allocated in the radio network controller such that addition of HS-PDSCH codes in the Node B becomes as efficient as possible.

In another aspect, the present invention is directed to a method of dynamically assigning orthogonal codes to different information signals in the cellular radio communication system. The method includes the steps of monitoring code usage within the radio base station to determine whether there are unused codes within the number of codes that are not being utilized as either DCH codes or HS-PDSCH codes; upon determining that there is at least one unused code, allocating by the radio base station, at least one unused code as an additional HS-PDSCH code; and upon later determining that the additional HS-PDSCH code has become needed as a DCH code, releasing the added HS-PDSCH code and make it available for DCH allocation.

In yet another aspect, the present invention is directed to a system for dynamically assigning orthogonal codes to different information signals in the cellular radio communication network. The system includes HS-PDSCH code allocation means within the radio network controller for allocating a minimum number of HS-PDSCH codes to the radio base station; and discretionary code allocation means within the radio base station for allocating and de-allocating additional HS-PDSCH codes in addition to the number of codes allocated from the radio network controller, without communicating the addition to the radio network controller.

DETAILED DESCRIPTION OF EMBODIMENTS

Figure 1:
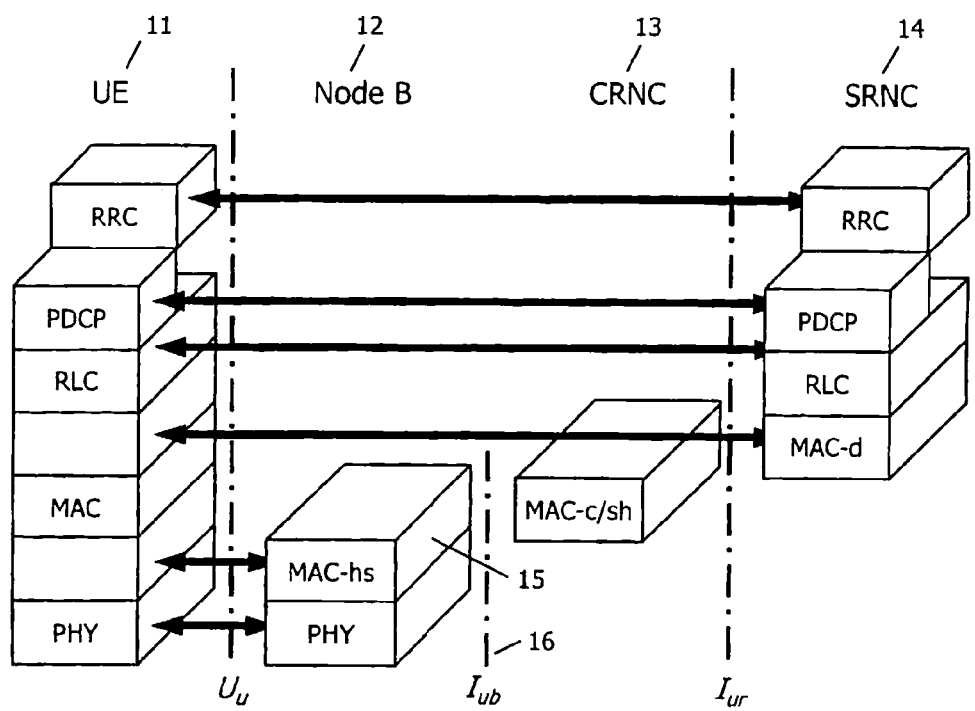
FIG. 1 (Prior Art) is a simplified block diagram illustrating protocol stacks and interfaces utilized between a User Equipment (UE) and an existing radio access network.
Figure 2:
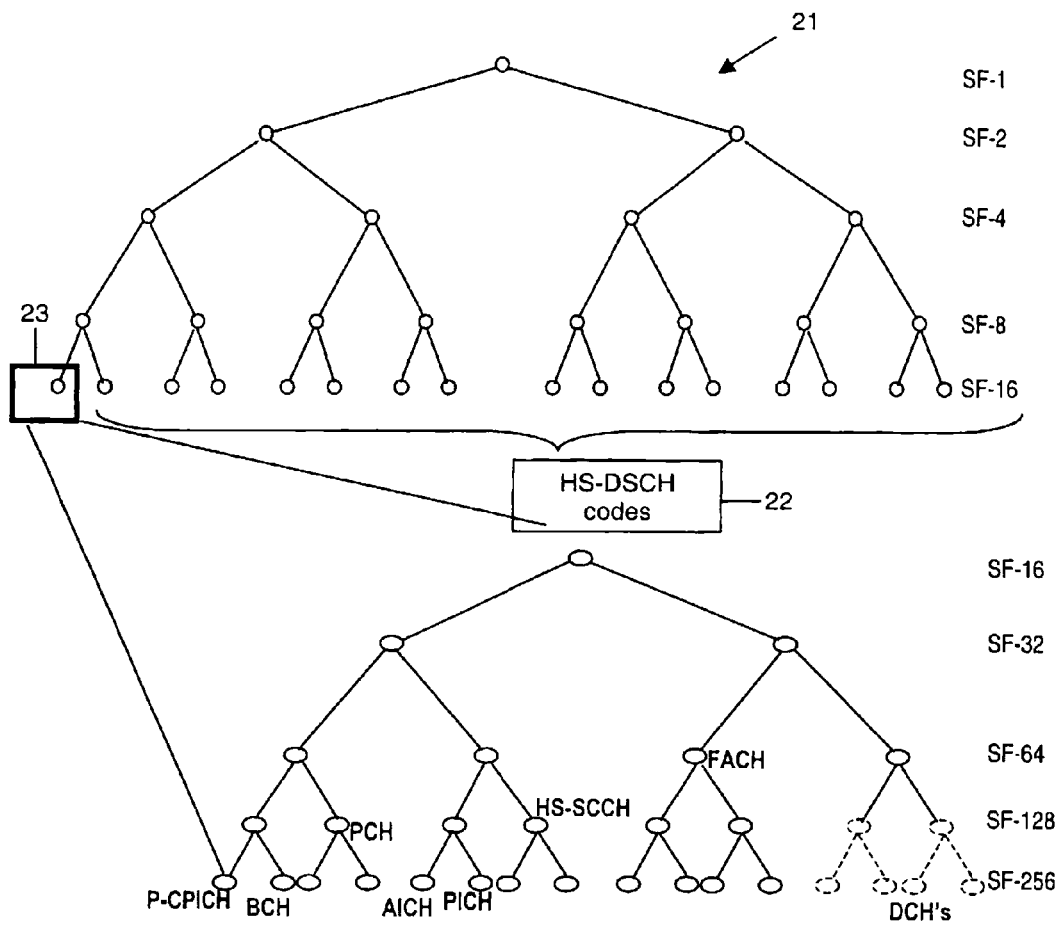
FIG. 2 (Prior Art) is an illustrative drawing of a typical Orthogonal Variable Spreading Factor (OVSF) code allocation tree and possible allocations for HS-PDSCH codes.
Figure 3:
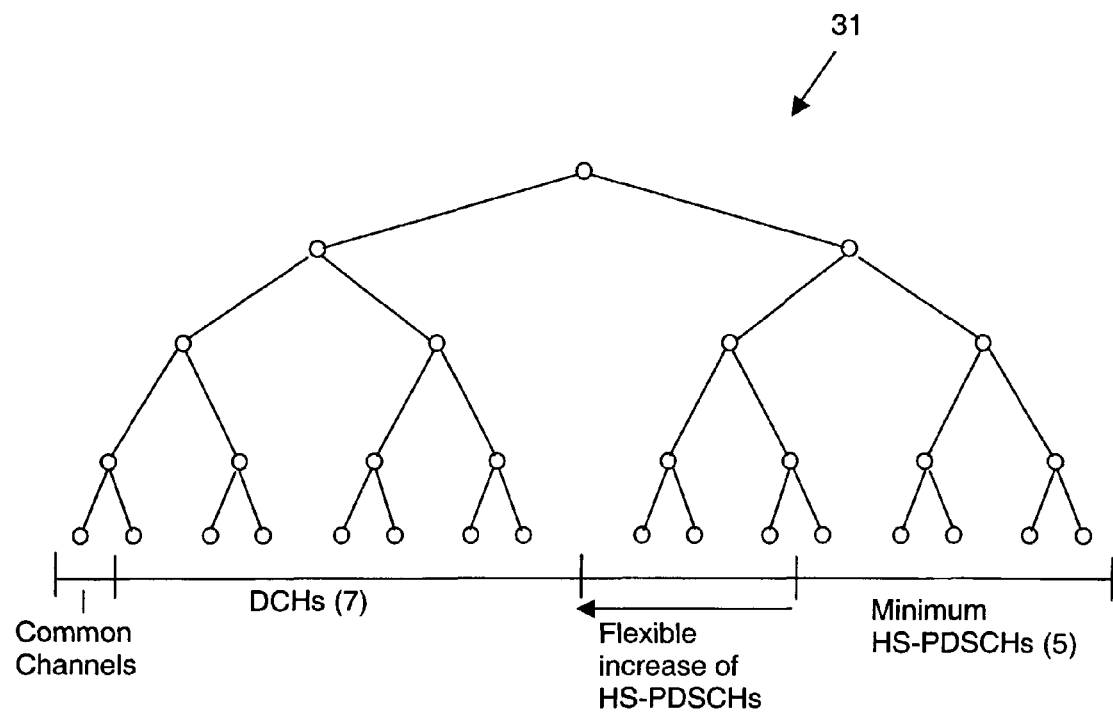
FIG. 3 is an illustrative drawing of an OVSF code allocation tree in which one aspect of the present invention is illustrated.

FIG. 3 is an illustrative drawing of an OVSF code allocation tree 31 in which one aspect of the present invention is illustrated. In the present invention, a minimum number of HS-PDSCH codes are allocated in the cell. As an example, five codes are allocated in FIG. 3 as the minimum number of HS-PDSCH codes. This allocation is preferably made from the RNC using a shared channel configuration message. Thus, the RNC controls the minimum number of HS-PDSCH codes that are allocated to each given cell. This allocation may be fixed or it may be dynamically steered via a code allocation algorithm in the RNC.

However, if there is space in the code tree, and the Node B has the capability to serve the cell with more than five HS-PDSCH codes for a certain period, the Node B may dynamically allocate additional HS-PDSCH codes without informing or requesting resources from the RNC. For example, if the RNC has allocated DCHs that occupy seven SF-16 code positions, the Node B may dynamically increase the number of HS-PDSCH codes to eight for a number of transmission time intervals. This process may be performed internally in the Node B without notifying the RNC.

The Node B can "de-allocate" the HS-PDSCH codes almost instantly if they are needed for DCHs. Thus, the Node B may "borrow" unused codes for as long as they are unused and thereby increase the transmission efficiency for HS-PDSCH without having to utilize complex allocation algorithms in the RNC for allocating and de-allocating HS-PDSCH codes. If the requirement for DCHs rises, the Node B immediately reduces the allocation of added or "borrowed" HS-PDSCH codes to provide the required number of DCHs, until reaching the minimum of five HS-PDSCH codes. For example, if the required number of DCHs rises to ten SF-16 level codes for DCHs, the Node B immediately reduces the allocation of HS-PDSCH codes back to the minimum of five HS-PDSCH codes.

In a system in which the RNC allocates a fixed number of HS-PDSCH codes, the Node B may treat the RNC's fixed allocation as the minimum allocation of HS-PDSCH codes. As additional HS-PDSCH codes are needed, and are available, the Node B dynamically allocates them. When the additional codes are needed for DCHs, the Node B then deallocates the additional HS-PDSCH codes.

In a system in which the controlling RNC dynamically allocates the number of HS-PDSCH codes, the Node B may treat the changing allocation from the RNC as an adjustment of the minimum number of HS-PDSCH codes. The Node B may then dynamically allocate and de-allocate additional HS-PDSCH codes even when the RNC is dynamically allocating the minimum number of HS-PDSCH codes as well. For the RNC, the task of dynamically allocating the minimum number of HS-PDSCH codes is much simpler than attempting to properly allocate the exact number of codes possible, which would require a large amount of information from the Node B to operate optimally. The minimum set of HS-PDSCH codes is more favorably governed by information that is already available in the RNC, such as DCH blocking information and traffic volumes for different types of services.

Note that the UEs do not rely on information from the RNC to be able to decode the HS-PDSCH. The information about what codes that are allocated for HS-PDSCH is signaled on the HS-SCCH, including HS-PDSCH code information of which the Node B has full control.

The solution provided by the present invention requires that the Node B be able to de-allocate "borrowed" HS-PDSCH codes quickly enough when the codes are needed for DCH purposes. In one embodiment, to ensure the Node B can free up resources fast enough for an incoming DCH request, the Node B may buffer a predefined code or number of codes, which, irrespective of whether or not they are needed for DCH allocations, may not be used for HS-PDSCH purposes. For example, the Node B may buffer an SF-8 code for this purpose.

Further, in one embodiment of the invention, the number of HS-PDSCH codes that the Node B is permitted to add may be limited. This may also be done with a parameter, indicating that the maximum number of HS-PDSCH codes in a cell should not exceed a certain value.

The HS-PDSCH codes are allocated consecutively from one side of the code tree. The invention preferably allocates DCH's from the opposite end of the code tree from the HS-PDSCH codes. According to 3GPP standards, the Primary Common Pilot Channel should have a certain position in the code tree, and the BCH should have another position in the code tree. All other channels are configurable. From the perspective of the code additions for HS-DSCH, it is advantageous to, as much as possible, separate allocations for HS-DSCH and for other channels. This separation increases the probability of finding unused codes in low-load situations that are adjacent to the existing HS-DSCH allocation, and therefore may be added to the HS-DSCH to increase the number of HS-PDSCH codes. In one embodiment, the RNC may employ a reallocation strategy to actively re-allocate users to increase the likelihood of having consecutive free codes adjacent to the HS-PDSCH codes.

Figure 4A:
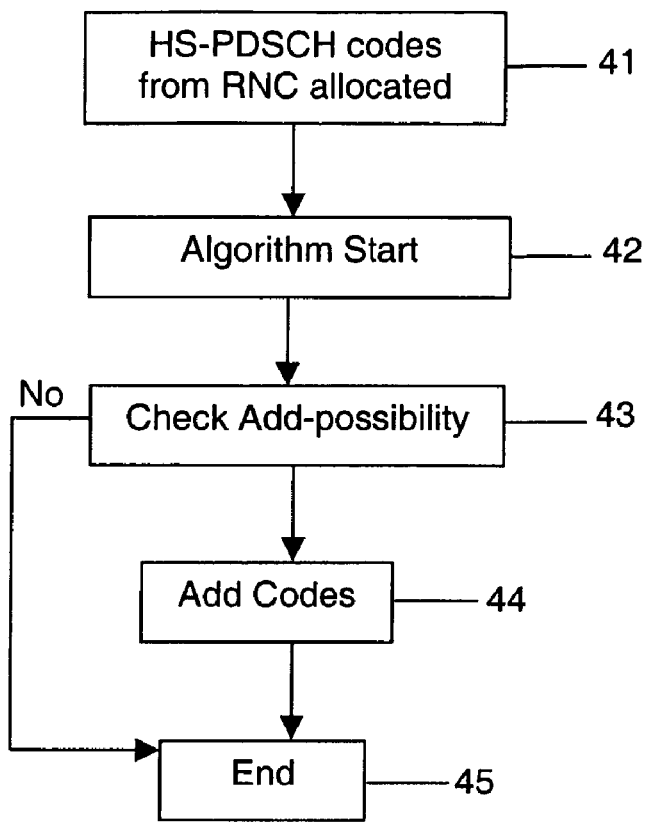
FIGS. 4A-4B are portions of a flow chart illustrating the steps of an embodiment of the method of the present invention.
Figure 4B:
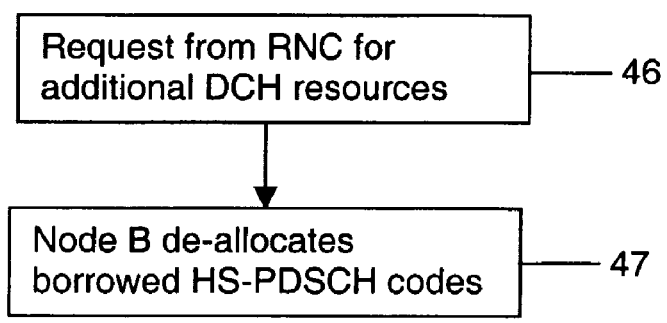

FIGS. 4A-4B illustrate portions of a flow chart for the steps of an embodiment of the method of the present invention. At step 41, the controlling RNC allocates a number of HS-PDSCH codes to the Node B, which considers the allocation to be a minimum allocation. The algorithm for allocating additional codes in Node B may be triggered by certain events, for example, a request for an additional DCH from the radio network controller or any other event that may impact the code availability. Alternatively, the algorithm for allocating additional codes in Node B may be run in a cyclic manner, or combinations of repetition cycles and events. Thus, in alternate embodiments of the present invention, the Node B may allocate additional HS-PDSCH codes in response to triggering events, or periodically, i.e., with a pre-determined repetition pattern. The repetition pattern is preferably utilized in combination with the algorithm that instantly de-allocates HS-PDSCH codes based on triggering events such as RNC-originated requests for codes, e.g., for DCH allocations. Thus, in one embodiment, that algorithm adds codes to the HS-DSCH allocation periodically, but reduces codes for the HS-DSCH allocation in an event-driven manner.

The allocation algorithm starts at step 42. At step 43, the Node B determines whether there are any unused codes available in the OVSF code tree. If not, the procedure ends at step 45. However, if it is determined at step 43 that there are unused codes available on the SF-16 level in the code tree, the process moves to step 44 where the Node B allocates additional HS-PDSCH codes from the unused code positions in the code tree. Before codes are allocated, the Node B may also check further criteria such as bandwidth availability on interfaces and hardware, such that the suggested additions will be supported. At step 45, the procedure ends.

FIG. 4B illustrates portions of an exemplary flow chart when the algorithm is triggered by an increase in DCH resources from the RNC. At step 46, it is determined that the "borrowed" codes currently being utilized for HS-PDSCH codes are needed for DCH purposes. At step 47, the Node B de-allocates a "borrowed" HS-PDSCH code and reallocates it for each DCH code needed. It is assumed in this embodiment that Node B only needs to keep control of the additionally "borrowed" codes that the radio network controller does not have information about. Thus, there is not any need for the Node B to request changes to the number of HS-PDSCH codes that are provided by the radio network controller as the minimum number of codes. This means that the RNC does not request resources for DCH purposes when the number of HS-PDSCH codes have reached the minimum number of codes in the Node B, i.e., the number of codes that the radio network controller believes have been allocated.

If the number of HS-PDSCH codes is being dynamically allocated by the RNC, the allocation is communicated to the Node B via new shared channel configuration messages.

Figure 5:
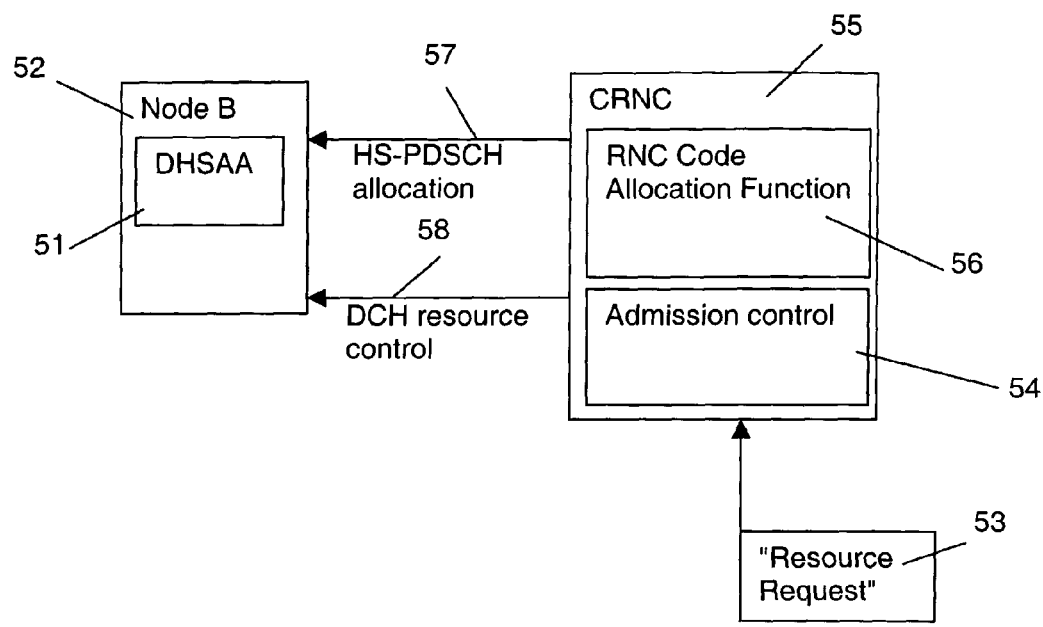
FIG. 5 is a simplified block diagram of an embodiment of the apparatus of the present invention.

FIG. 5 is a simplified block diagram of an embodiment of the apparatus of the present invention. The apparatus includes a Discretionary HS-PDSCH Allocation Algorithm (DHSAA) 51 implemented within a modified Node B 52. When requests for resources 53 for connections such as speech or video connections (DCH's) arrive at the CRNC 55, an admission control function 54 is created in the CRNC 55 and an RNC code allocation function 56 is checked. The admission control function may also determine whether there is available power. If the RNC code allocation function indicates that DCH codes are available according to the current DCH load and the HS-PDSCH allocation 57 sent to the Node B, the CRNC sends a request for DCH resources 58 with a setup request. Similarly, if a connection is released, the CRNC will pass on this message to the Node B. In one embodiment of the invention, these DCH resource control messages may constitute the trigger of the DHSAA algorithm 51.

Further, within the CRNC 55, the RNC Code Allocation Function 56 may also determine the amount of HS-PDSCH codes that should be configured in the Node B 52. This may be dependent on measurements of ongoing or expected traffic. The HS-PDSCH allocation 57 determines the minimum HS-PDSCH allocation for the Node B. The minimum HS-PDSCH allocation is sent to the DHSAA 51 in the Node B where the minimum HS-PDSCH allocation is used as the basis for additional HS-PDSCH allocations. The DHSAA is provided with information about the DCH needs and the HS-PDSCH code allocation and based on that information, the DHSAA adds HS-PDSCH codes according to code availability, and removes HS-PDSCH codes that were previously added if DCH requests so require.

Those skilled in the art will readily appreciate that the present invention may be implemented using either hardware, or software, or both, and further, software implementations may vary using different languages and data structures. The present invention is not limited to a specific language and/or class of languages, nor is it limited to any single data structure implantation.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

What is claimed is:

1. An apparatus for dynamically assigning orthogonal codes to different information signals communicated between a radio base station and a user terminal in a cellular radio communication system in which a number of codes are allocated for dedicated transport channels (DCHs) and a number of codes are allocated for high speed downlink shared channels (HS-DSCHs), and a radio network controller allocates codes for HS-DSCH physical channels (HS-PDSCH codes) to the radio base station, said apparatus comprising:
    discretionary code allocation means within the radio base station, said discretionary code allocation means allocating and de-allocating additional HS-PDSCH codes from unused codes that were not allocated by the radio network controller, in addition to the HS-PDSCH codes that were allocated by the radio network controller, without communicating with the radio network controller, in addition to a minimum number of HS-PDSCH codes; and
    wherein the discretionary code allocation means treats the HS-PDSCH codes allocated by the radio network controller as the minimum number of HS-PDSCH codes.

2. The apparatus of claim 1 wherein the discretionary code allocation means allocates as the additional HS-PDSCH codes, codes that are adjacent to the HS-PDSCH codes allocated by the radio network controller.

3. The apparatus of claim 1, wherein the discretionary allocation means monitors code use to determine whether there are unused codes within the codes that are not being utilized as either DCH codes or HS-PDSCH codes, wherein when there are unused codes, the discretionary code allocation means allocates additional HS-PDSCH codes from the unused codes.

4. The apparatus of claim 3, wherein the discretionary code allocation means is configured to:
    allocate at least one unused code as an additional HS-PDSCH code, responsive to a determination that there is at least one unused code; and
    reallocate the additional HS-PDSCH code as a DCH code, responsive to a further determination that the additional HS-PDSCH code has become needed as a DCH code.

5. The apparatus of claim 1, further comprising means within the radio base station for receiving a revised minimum number of HS-PDSCH codes from the radio network controller.

6. The apparatus of claim 1, wherein the discretionary code allocation means within the radio base station allocates additional HS-PDSCH codes in response to triggering events.

7. The apparatus of claim 1, wherein the discretionary code allocation means within the radio base station allocates additional HS-PDSCH codes with a predetermined repetition pattern, and de-allocates the additional HS-PDSCH codes in response to triggering events.

8. A method of dynamically assigning spreading codes to different information signals communicated between a radio base station and a user terminal in a cellular radio communication system in which a number of codes are allocated for dedicated transport channels (DCHs) and a high speed downlink shared channel (HS-DSCH), and a radio network controller allocates a number of codes for HS-DSCH physical channels (HS-PDSCH codes) to the radio base station, said method comprising the steps of:
    monitoring code use within the radio base station to determine whether there are unused codes that are not being utilized as either DCH codes or HS-PDSCH codes; and
    upon determining that there is at least one unused code that was not allocated by the radio network controller, allocating by the radio base station, the at least one unused code as an additional HS-PDSCH code, in addition to the number of HS-PDSCH codes allocated by the radio network controller, without communicating with the radio network controller, and treating the number of HS-PDSCH codes allocated by the radio network controller as a minimum number of HS-PDSCH codes allocated to the radio base station.

9. The method of claim 8, further comprising:
    determining at a later time that the additional HS-PDSCH code has become needed as a DCH code; and
    reallocating by the radio base station, the additional HS-PDSCH code as a DCH code.

10. The method of claim 8, further comprising receiving within the radio base station, a revised minimum number of HS-PDSCH codes from the radio network controller.

11. The method of claim 8, wherein the step of allocating by the radio base station, at least one unused code as an additional HS-PDSCH code includes allocating additional HS-PDSCH codes in response to triggering events.

12. The method of claim 8, wherein the step of allocating by the radio base station, at least one unused code as an additional HS-PDSCH code includes allocating additional HS-PDSCH codes with a predetermined repetition pattern, and de-allocating the additional HS-PDSCH codes in response to triggering events.

13. A system for dynamically assigning spreading codes to different information signals communicated between a radio base station and a user terminal in a cellular radio communication network in which a number of codes are allocated between dedicated transport channels (DCHs) and high speed downlink shared channels (HS-DSCHs), and a radio network controller allocates codes for HS-DSCH physical channels (HS-PDSCH codes) to the radio base station, said system comprising:
    an HS-PDSCH code allocation apparatus within the radio network controller configured to allocate a minimum number of HS-PDSCH codes to the radio base station; and
    a discretionary code allocation apparatus within the radio base station configured to allocate and de-allocate additional HS-PDSCH codes from unused codes that were not allocated by the radio network controller, in addition to the minimum number of HS-PDSCH codes that were allocated by the radio network controller, without communicating with the radio network controller.

14. The system of claim 13, wherein the discretionary code allocation apparatus is configured to monitor code use to determine whether there are unused codes within the number of codes that are not being utilized as either DCH codes or HS-PDSCH codes, wherein when there are unused codes, the discretionary code allocation means allocates and de-allocates additional HS-PDSCH codes from the unused codes.

15. The system of claim 14, wherein the discretionary code allocation apparatus is configured to de-allocate an additional HS-PDSCH code when the additional HS-PDSCH code has become needed as a DCH code.

16. The system of claim 13, wherein:
   the HS-PDSCH code allocation apparatus within the radio network controller is configured to revise the minimum number of HS-PDSCH codes allocated to the radio base station; and
   the discretionary code allocation apparatus within the radio base station is configured to receive the revised minimum number of HS-PDSCH codes from the radio network controller.

17. The system of claim 13, wherein the discretionary code allocation apparatus within the radio base station is configured to allocate additional HS-PDSCH codes in response to triggering events.

18. The system of claim 13, wherein the discretionary code allocation apparatus within the radio base station is configured to allocate additional HS-PDSCH codes with a predetermined repetition pattern, and to de-allocate the additional HS-PDSCH codes in response to triggering events.

19. An apparatus within a radio base station configured to dynamically assign orthogonal codes to different information signals communicated between a radio base station and a user terminal in a cellular radio communication system in which a number of codes are allocated for dedicated transport channels (DCHs) and a number of codes are allocated for high speed downlink shared channels (HS-DSCHs), and a radio network controller allocates codes for HS-DSCH physical channels (HS-PDSCH codes) to the radio base station, wherein the apparatus is configured to:
   treat the HS-PDSCH codes allocated by the radio network controller as a minimum number of HS-PDSCH codes; and
   allocate and de-allocate additional HS-PDSCH codes from unused codes that were not allocated by the radio network controller, in addition to the HS-PDSCH codes that were allocated by the radio network controller, without communicating with the radio network controller.

* * * * *